May 22, 1956 R. S. PARK ET AL 2,746,912
PRODUCTION OF CHLORAL OF LOW WATER CONTENT
Filed Dec. 15, 1951 2 Sheets-Sheet 1
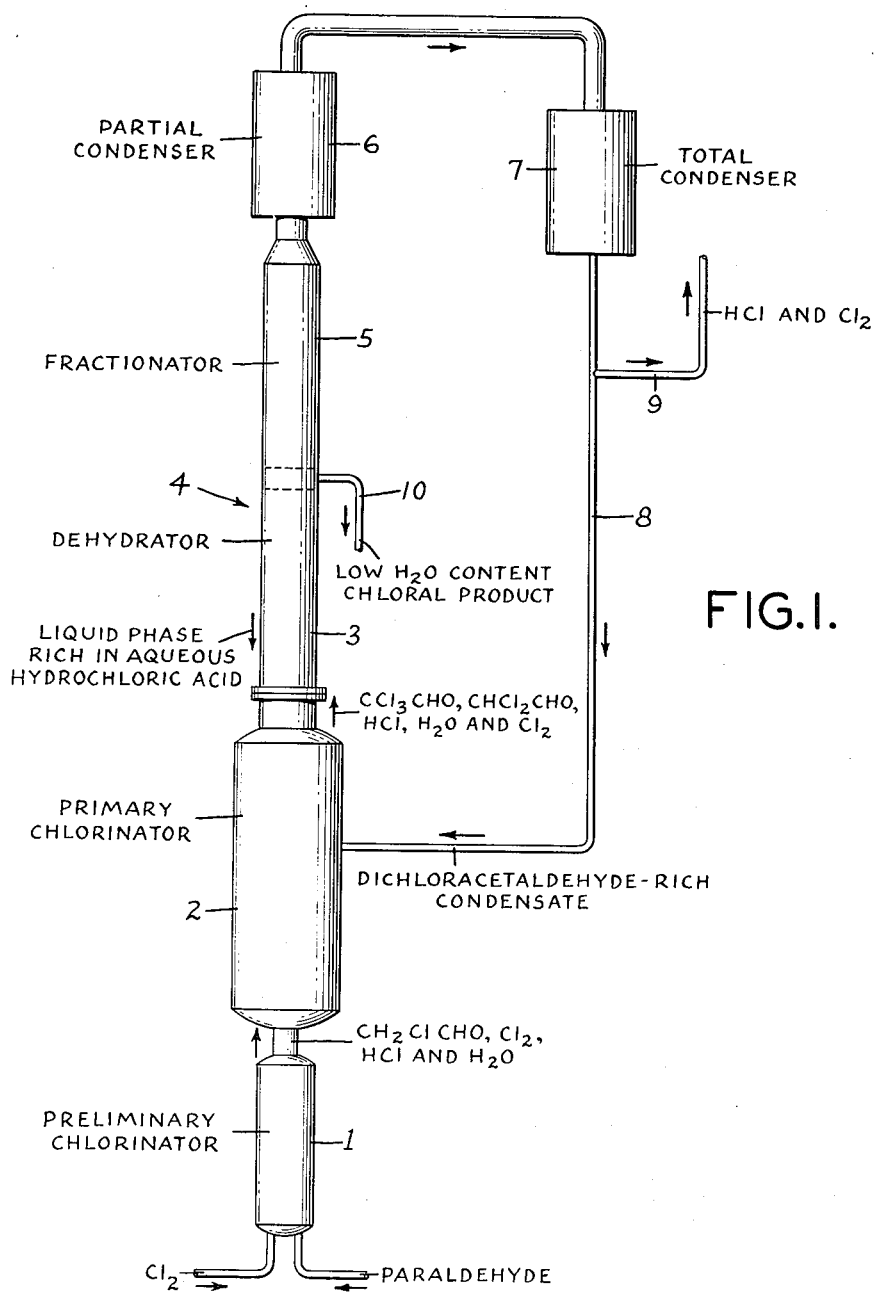
FIG.I.
INVENTORS.
RALPH S. PARK
ROBERT H. STAIR
BY
ATTORNEY.

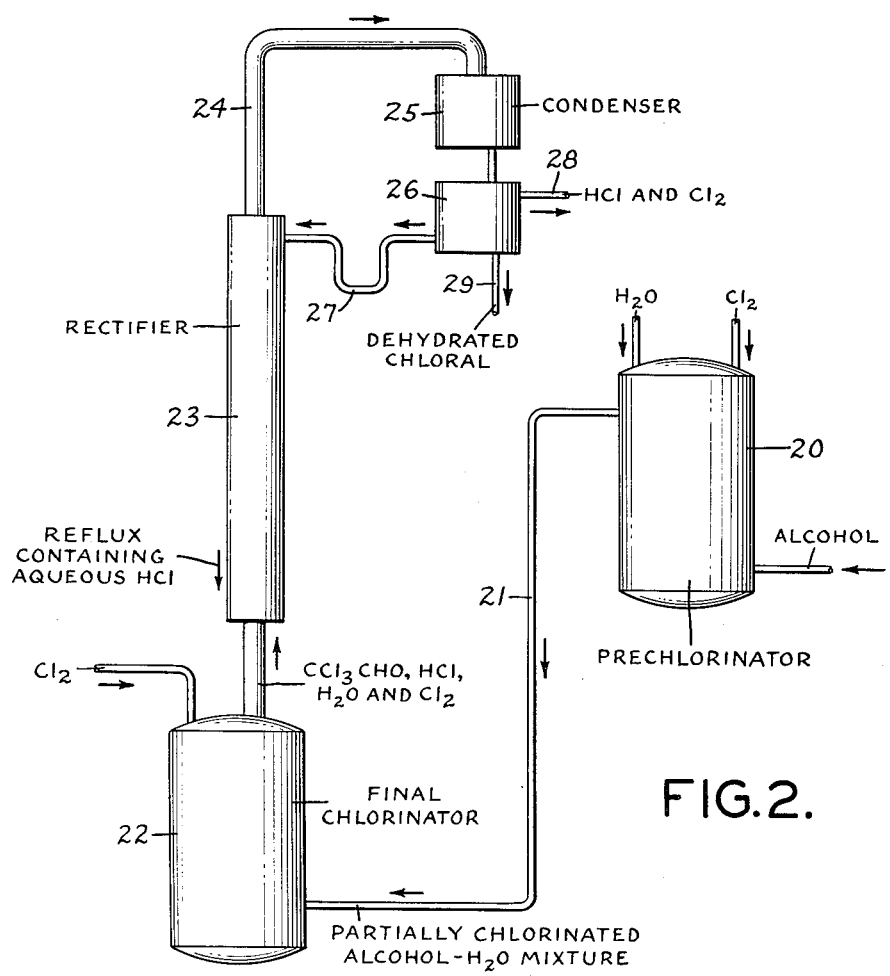

United States Patent Office 2,746,912
Patented May 22, 1956

2,746,912

PRODUCTION OF CHLORAL OF LOW WATER CONTENT

Ralph S. Park, Swarthmore, Pa., and Robert H. Stair, Collingswood, N. J., assignors to Allied Chemical & Dye Corporation, New York, N. Y., a corporation of New York Application December 15, 1951, Serial No. 261,898

4 Claims. (Cl. 202—42)

This invention relates to the preparation of chloral, and is particularly concerned with improved procedure for reducing the water content, or substantially dehydrating, mixtures of chloral and water, e. g. chloral hydrate ($CCl_3CHO.H_2O$).

The important insecticidal material 2,2-bis (parachlorophenyl) 1,1,1-trichloroethane, commonly known as DDT, is prepared by condensing chloral with monochlorobenzene in the presence of an acid condensing agent, generally sulfuric acid. While chloral hydrate or chloral containing substantial amounts of water may be employed in the condensation reaction, the water present in the chloral, in addition to that formed in the reaction, dilutes and weakens the sulfuric acid condensing agent, and to minimize the amount of water present in the reaction mixture, it is accordingly highly desirable that substantially anhydrous chloral or chloral containing only a small percentage of water be employed.

The boiling point of chloral (98° C.) is separated by only 2° C. from the boiling point of water and thus chloral cannot be separated from mixtures thereof with water by ordinary fractionation. Vacuum distillation of chloral-water mixtures has been practiced in the past as one means for carrying out such a separation. It is also known to recover chloral from aqueous chloral solutions by treatment or distillation thereof with sulfuric acid. Thus, as described in U. S. Patents 2,478,741, 2,478,152 and 774,151, chloral hydrate formed by reacting ethanol and chlorine is dehydrated by adding sulfuric acid and distilling off chloral. Further, U. S. P. 2,559,247 discloses removal of water from aqueous chloral mixtures by adding benzene thereto, distilling to separate a water-benzene azeotrope and fractionally distilling the residue to recover chloral. While a small amount of water combines with a small amount of hydrogen chloride present during the above benzene distillation step, and is recovered as aqueous hydrochloric acid in the distillate towards the end of the distillation, it is the benzene which functions as the effective dehydrating agent according to this patent. All of the aforementioned prior art methods suffer from various disadvantages, e. g. in requiring use of (1) special and expensive equipment or (2) costly treating agents involving one or more additional processing steps.

One object of the invention is to reduce the amount of water present in mixtures of chloral and water. Another aim of the invention is to provide procedure for the preparation of substantially dehydrated chloral or chloral of low water content. Yet another object is the manufacture of chloral having the aforesaid low water content and suitable for use in making DDT, by a simplified economical continuous process. A further object of the invention is to afford procedure for continuously preparing chloral of greatly reduced water content from chloral-water mixtures, in conjunction with chlorination operations for producing such mixtures, e. g. chlorination of acetaldehyde, paraldehyde, alcohol or their partially chlorinated derivatives in the presence of water. Other objects and advantages of the invention will appear hereinafter.

Briefly, the water content of a mixture of chloral and water is reduced and the other foregoing objects are accomplished in accordance with the invention by rectifying such a mixture in the presence of hydrogen chloride, condensing out a liquid phase rich in aqueous hydrochloric acid and separating from the overhead vapor, chloral of lower water content than said mixture, the hydrogen chloride being substantially the sole dehydrating agent. According to the invention, chloral of low water content is produced from a wet chloral starting material of higher water content, e. g. containing ¼ to 5 mols of water per mol of chloral, by forming a vapor mixture of said starting material containing chloral and water, and at least 1 part by weight of hydrogen chloride for every 4 parts of water vapor present, subjecting said vapor mixture to rectification with repeated cooling and condensation of aqueous hydrochloric acid therefrom and vaporization of chloral from the condensates, whereby an overhead product comprising chloral vapor of low water content and a residual product comprising a liquid phase rich in aqueous hydrochloric acid are obtained. Such phase also usually contains varying proportions of chloral which condenses along with the aqueous hydrochloric acid during rectification, but which does not thereafter vaporize under the particular conditions of operation.

To bring about removal of water from the chloral starting material in the foregoing manner by condensation of the water in the form of a liquid phase rich in aqueous hydrochloric acid, the rectifying operation should be carried out at a temperature below the boiling point of at least a portion of the mixture of hydrogen chloride and water vapor present. It is at once apparent that in modern methods of manufacturing chloral wherein chloral containing substantial amounts of water, or chloral hydrate, is produced by chlorinating organic materials such as ethanol or acetaldehyde in the presence of water, the hydrogen chloride produced in the chlorination reaction itself may be directly used as the chloral dehydrating agent without requiring utilization of hydrogen chloride from extraneous sources for this purpose, thus completely eliminating, for example, the additional costly sulfuric acid or benzene treating steps of the prior art for removal of water from chloral water mixtures.

The mixtures of chloral and water employed as starting material in the invention may be obtained from any suitable source. Thus, such mixtures are obtainable by chlorinating ethanol or its partially chlorinated derivatives, e. g. mono- and dichloracetaldehyde, chlorinated acetaldehyde alcoholates and chlorinated acetals. Processes of this type are illustrated in U. S. Patents 2,478,741, 2,478,152 and 2,443,183. Another way of preparing the chloral-water starting mixtures of the invention is by chlorinating acetaldehyde, paraldehyde or their partially chlorinated derivatives, e. g. mono- or dichloracetaldehyde, for example in accordance with the process of U. S. P. 2,552,934 or of U. S. application Serial No. 91,018, filed May 2, 1949, by J. A. Otto and B. Veldhuis, now Patent 2,702,303. Further, the aqueous chloral mixtures to be dehydrated in accordance with the invention may be prepared by chlorinating diethyl ether or its partially chlorinated derivatives, e. g. α, β dichlorethyl ethyl ether, β, β' dichlordiethyl ether, and mono- and dichloracetaldehyde alcholate, as disclosed in U. S. application Serial No. 85,934, filed April 6, 1949, by E. E. Gilbert, J. A. Otto and B. Veldhuis, now Patent 2,697,119.

In all of the foregoing processes for production of chloral, water in varying amounts is present in the reaction mixture to facilitate the chlorination reaction, and the final reaction mixture accordingly contains chloral and substantial portions of water, e. g. from about ¼ to 5 mols or more per mol of chloral. Mixtures of chloral and water corresponding to chloral hydrate contain one mol of water per mol of chloral, representing a chloral-water mixture containing about 11% water by weight.

As heretofore mentioned, in order to eliminate the bulk of the water present in the chloral-water starting mixtures of the invention to make chloral more suitable for condensation with monochlorobenzene in the production of DDT, following the chlorination reaction for production of chloral, it has generally been the practice to remove the liquid chlorinator contents, add sulfuric acid thereto and distill the mixture to obtain chloral as distillate. In accordance with the instant invention the chloral product produced in the foregoing chlorination reaction may be dehydrated simply by vaporizing the chloral and water directly from the liquid chlorinator contents, rectifying the vapors in the presence of a substantial amount of HCl gas, conveniently obtained as a product of the chlorination reaction, maintaining the temperature in the rectifying zone below the boiling point of at least a portion of the mixture of hydrogen chloride and water vapor present, condensing out at least a portion of said water vapor in the form of aqueous hydrochloric acid through association of such water vapor with hydrogen chloride and recovering the overhead vapors as distillate containing chloral of lower water content than the starting mixture.

In the preferred embodiment of the invention wherein chlorination of the organic starting material to chloral takes place continuously, the rectifier may be an integral part of the chlorination apparatus, and the vapors of chloral, water and hydrogen chloride are continuously fed from the chlorinator while the chlorination reaction is proceeding, into the rectifier, overhead vapors of chloral and any minor proportion of water vapor therein being condensed as product, the liquid phase rich in aqueous hydrochloric acid condensed in the rectifier being returned to the chlorinator. In this manner the water content of the chlorinator is maintained substantially constant except for comparatively small losses which may be supplied to the chlorinator at various intervals from an outside source. If desired, effluent vapors from the rectifier may be passed through a partial condenser first to condense out low boiling partially chlorinated organics such as dichloracetaldehyde which may be returned in the reflux to the chlorinator along with the aqueous hydrochloric acid. It is understood that in making chloral using alcohol, acetaldehyde or ether type starting materials, one or more chlorinators may be used in accordance with known practice in which case the rectifying apparatus or column utilized in the invention process is associated with the final chlorinator containing the chloral product admixed with water.

The mixture of chloral and water to be dehydrated may be subjected to heating or boiling to evolve copious quantities of vapors containing chloral and water. The temperatures employed for this purpose, may, for example, range from about 85° to almost 100° C. Where the invention is carried out in accordance with preferred procedure by continuous rectification in conjunction with a continuous chlorination operation for producing chloral employing any of the above organic starting materials, the temperature of the chlorination reaction taking place in the chlorinator directly connected with the HCl rectifier, is maintained within the above temperature range so that vapors of chloral, water and HCl in substantial amounts continuously leave the chlorinator and enter the rectifier while the chlorination reaction proceeds.

The vapors enter the bottom of the rectifying apparatus, usually in the form of a column or tower directly connected to and superimposed above the chlorinator, wherein they are subjected to a temperature which is maintained below the boiling point of at least a portion of the mixture of hydrogen chloride and water vapor present, this being conveniently accomplished, according to the invention principles as hereinafter more fully described, by maintaining the temperature at the top of the rectifier column such that a portion or most of the water vapor in the vapor mixture present in the rectifying zone combines with at least a portion of the HCl therein to form a comparatively high boiling hydrochloric acid composition. The association or combination of water and hydrogen chloride gas results in the elevation of the boiling point of the complex above the boiling point of chloral and water. Chloral does not associate with hydrogen chloride, and its boiling point is not elevated.

Under these conditions a high boiling hydrochloric acid of say about 7 to 30% HCl strength may be formed. Its boiling point is higher than the temperature maintained in the rectifying zone, more specifically set out below, so that a liquid phase rich in aqueous hydrochloric acid and containing a portion or most of the water present in the vapors entering the column, condenses and flows back down the column. An overhead product comprising chloral of low water content and a residual product comprising a chloral solution rich in aqueous hydrochloric acid are thus obtained. Such residual product is returned to the chlorinator to recover chloral values contained in such product and to replenish at least a part of the water lost from the chlorinator by vaporization.

The temperature at the top of the rectifying column corresponding to the temperature of the vapors leaving the rectifier depends on the composition of the vapors entering the rectifying column and the efficiency thereof as regards removal of water in the form of aqueous hydrochloric acid. The invention process is generally operated with a substantial portion of hydrogen chloride present in the vapors entering the rectifier and sufficient to give, together with a substantial portion of the water present, the foregoing high boiling hydrochloric acid, e. g. having a strength within the 7–30% HCl range noted above. For this purpose at least 1 part by weight of hydrogen chloride, and preferably from 5 to 10 parts by weight thereof, are employed for every 4 parts of water vapor present. If the rectification feature of the invention is employed in combination with the chlorination process for obtaining the chloral, a large excess of hydrogen chloride is usually present, but this is not detrimental to the efficiency of the rectifying operation of the invention.

Under the foregoing conditions of procedure, the temperature of the vapors at the top of the rectifying column generally does not exceed 95° C. Where enough or more than enough hydrogen chloride is present to convert most of the water present to aqueous hydrochloric acid and the column is operating most efficiently, the temperature of the vapors leaving the top of the rectifiers may be as low as 70° C. or less. The more hydrogen chloride and particularly the less water vapor present in such exit gases, the lower will be the temperature thereof. The rectifying process thereof is usually operated with a sufficient amount of hydrogen chloride present and at such an efficiency that the temperature at the top of the rectifier column is between 75° and 90° C.

The temperature at the bottom of the rectifying column corresponding to the temperature of the vapors entering the column may vary, but of course such temperature is higher than the temperature at the top of the column. Where the vapors containing chloral, water and hydrogen chloride are fed directly from a chlorinator wherein the chloral is formed and into the bottom of the rectifying column, the temperature of the entering vapors is usually substantially the same as the temperature maintained in such chlorinator. Under usual operating conditions where the temperature at the top of the rectifying column is between 75 and 90° C., the corresponding temperature at the bottom is customarily between about 85° C. and 100° C. The efficiency of the column is generally in direct proportion to the temperature differential between the top and bottom of the rectifying column, i. e. the higher the temperature difference between the top and bottom of the column, the greater is the efficiency thereof.

While operations within the above noted temperature limitations in accordance with the invention generally does not result in obtaining completely dehydrated chloral, as will be noted hereinafter, chloral may be thereby produced containing only say 2 to 4% water, representing in any case a substantial reduction of the considerably higher water content of the usual initial chloral-water mixtures subjected to our novel rectifying procedure. It is not ordinarily commercially practical to maintain conditions such that complete dehydration of the chloral starting material takes place, and generally, chloral having a reduced amount of water within the aforementioned range is entirely suitable for condensation with monochlorobenzene in the known manner for DDT manufacture.

The following examples are illustrative of the invention, all quantities therein being expressed in parts by weight.

*Example 1.*—Liquid chloral hydrate is charged to a still equipped with a rectifying or fractionating column and a condenser. The liquid contents of the still are subjected to distillation during which time dry hydrogen chloride is fed into the vapor space of the still. Distillation is carried out using a 1:1 reflux ratio and two samples of distillate are collected over two separate distilling temperature ranges, the temperature of the still contents being held at about 95° C. and the distilling temperature, i. e. the temperature of the vapors at the top of the fractionating column, being controlled by the rate of hydrogen chloride input. Data and analyses on the samples obtained are noted in Table I below:

*Table I*

| Sample | Distilling Temperature, °C. | Distillate Analysis | | |
|---|---|---|---|---|
| | | Percent Chloral | Percent $H_2O$ | Percent HCl |
| 1 | 87–88 | 96.0 | 2.9 | 0.6 |
| 2 | 77–80 | 96.8 | 2.1 | 2.0 |

It is seen from the above table that the chloral distillates obtained contain on the order of only about 20% or less of the water present in the original chloral hydrate as a result of the hydrogen chloride combining with the major portion of the water during rectification to condense a high boiling aqueous hydrochloric acid which is separated from the chloral vapors in accordance with the invention principles.

*Example 2.*—A still is charged with crude chloral hydrate and distillation and fractionation thereof carried out while introducing dry hydrogen chloride gas into the liquid still contents. During distillation the distilling temperature of the vapors is maintained at 80° C. by controlling the rate of hydrogen chloride input to the still. Several fractions are taken off and analyzed as the distillation progresses. Results are set forth in Table II below:

*Table II*

| Sample | Amount of distillate | Analysis | | |
|---|---|---|---|---|
| | | Percent Chloral | Percent $H_2O$ | Percent HCl |
| 3 | 48 parts | 92.3 | 2.6 | 2.8 |
| 4 | 53 parts | 92.0 | 2.5 | 2.6 |
| 5 | 51 parts | 92.7 | 2.0 | 2.4 |
| 6 | 52 parts | 91.3 | 3.9 | 2.5 |
| 7 [1] | 58 (still residue) | 12.7 | 42.3 | 17.2 |

[1] This still residue also contains a substantial portion of trichloracetic acid by-product present in the crude chloral hydrate.

Again, it is noted from the above table that the chloral distillates obtained are of substantially lower water content than the original chloral hydrate solution treated and that the water thus removed returns to the still in the form of a liquid phase rich in aqueous hydrochloric acid as evidenced by the high water content of about 42% in the still residue.

*Example 3.*—This example is described in connection with the apparatus and flow sheet illustrated in Fig. 1 of the accompanying drawing, by means of which the invention process may be practiced, and the process set forth is carried out continuously.

Chlorine and paraldehyde in a ratio of about 3 mols of chlorine per mol of acetaldehyde equivalent are simultaneously introduced into the bottom of a small preliminary chlorination vessel 1 which is at all times kept full of liquid reaction mixture. In chlorinator 1 the paraldehyde is depolymerized and the acetaldehyde thus formed undergoes partial chlorination mostly to monochloracetaldehyde with probable production also of a small amount of dichloracetaldehyde.

The liquid and vapor mixture from the preliminary chlorinator and comprising, in addition to partially chlorinated acetaldehydes mostly in the form of monochlorinated acetaldehydes, unreacted chlorine and HCl formed in the reaction, are discharged directly into the bottom of a primary chlorination vessel 2 of substantially greater size than preliminary chlorinator 1 and maintained directly above it, the primary chlorinator also containing a body of liquid reaction mixture. The partially chlorinated acetaldehydes are further chlorinated in vessel 2 to chloral through the intermediate production of dichloracetaldehyde. About 5% antimony chloride as catalyst and 15% water are added to the primary chlorinator 2, and the reaction therein is carried out at a temperature of about 90–96° C.

The vapors leaving the top of the primary chlorinator 2 and consisting primarily of chloral, dichloracetaldehyde, hydrogen chloride, water and a small quantity of free chlorine, pass directly into the lower rectifying or dehydrating section 3 of a fractionating column 4 positioned directly above chlorinator 2. In rectifying section 3 the vapors flow countercurrent to a small reflux stream. The major portion of the water present in the vapors in this section combines with a portion of the hydrogen chloride in such vapors and condenses in rectifying section 3 as a liquid phase rich in aqueous hydrochloric acid, containing about 2% to 5% HCl, which aqueous phase returns to chlorinator 2 as liquid reflux. The vapor temperature at the top of the dehydrating section 3 of the fractionating column varies from about 80 to 87° C.

The effluent vapors from dehydrating section 3 then pass into the fractionating section 5 of column 4, wherein chloral and dichloracetaldehyde are separated. The vapors in this section pass countercurrent to a larger reflux stream than in dehydrating section 3. Vapors leaving fractionating section 5 pass through a partial or fractional condenser 6 maintained at about 50–55° C. The liquid condensed therein consists principally of chloral, which returns as reflux for fractionating section 5 of column 4. At the bottom of fractionating section 5 the reflux comprising essentially chloral of reduced water content is divided into approximately equal portions, one portion being removed as chloral product through line 10 and the balance flowing down dehydrating section 3 of the column as reflux along with the aqueous hydrochloric acid-containing phase condensed in this section.

The vapors passing partial condenser 6 are rich in dichloracetaldehyde and these vapors are conducted to total condenser 7, wherein the major portion of such vapors is condensed to form a dichloracetaldehyde-rich condensate, which is returned through line 8 to primary chlorinator 2 for further chlorination. Uncondensed gases passing the total condenser and consisting of about 95% hydrogen chloride and about 5% chlorine by volume are vented through line 9 and the individual components thereof recovered in conventional manner.

Both of the chlorinators 1 and 2 and both sections 3 and 5 of fractionating column 4 are packed with Raschig rings for greater efficiency.

In order to obtain adequate boilup to provide sufficient reflux for fractionating column 4 and sufficient product takeoff, additional heat may be supplied to the primary chlorinator 2. The liquid level in chlorinator 2 is maintained constant by regulating the rate of product takeoff, and the degree of chlorination of the contents of chlorinator 2 is maintained constant by the regulation of the chlorine feed.

A tabulation of analyses of two chloral product fractions and the corresponding chlorinator 2 contents for a typical run are set forth in Table III below. The results noted in the table particularly point out the dehydrating effect of rectifying column 3.

Table III

| Sample | Source | Analysis | | |
|---|---|---|---|---|
| | | Percent Chloral | Percent H₂O | Percent HCl |
| 8 | Product | 96.3 | 3.7 | 0.5 |
| 8a¹ | Chlorinator 2 | 62.9 | 14.0 | 3.2 |
| 9 | Product | 93.5 | 2.6 | 0.7 |
| 9a¹ | Chlorinator 2 | 62.5 | 12.8 | 1.8 |

¹ These samples also contain trichloracetic acid by-product of the chlorination reaction.

*Example 4.*—In another embodiment of the invention for continuously producing chloral of comparatively low water content, described in connection with the apparatus and flow sheet illustrated in Fig. 2 of the drawing, alcohol is charged to a prechlorinator vessel 20 along with chlorine and water, and the alcohol is partially chlorinated to form a mixture of intermediate chlorination products. This partially chlorinated alcohol reaction mixture is then passed through line 21 into a final chlorinator 22. Additional chlorine is introduced into chlorinator 22 and chlorination of the partially chlorinated alcohol mixture therein is continued at a temperature ranging from 90° C. to 100° C. to produce a reaction mixture containing about 65% chloral and from about 20–35% water.

A vapor mixture consisting essentially of about 43% chloral, 5% water, 50% hydrogen chloride and some chlorine and partially chlorinated alcohol derivatives, is passed from chlorinator 22 into a packed rectifier column 23. The distilling temperature at the top of the rectifier is maintained at from about 80° C. to 85° C., causing combination of most of the water and a portion of the HCl in the vapors, and condensation of these components as aqueous hydrochloric acid which returns, together with some of the partially chlorinated alcohol derivatives and some chloral, as reflux to chlorinator 22 to thereby replenish the water content of the reaction mixture therein. The bottom of the rectifier column is maintained at a temperature of about 90° C. to 95° C.

The vapor effluent from rectifier 23 then passes through vapor line 24 to condenser 25 operating at a temperature of about 10° C. to condense out chloral of reduced water content. The condensate and uncondensed gases are then led into a receiver 26 wherein about 50% of the dehydrated chloral condensate is taken off as chloral product containing about 2% water and the remaining portion of the condensate is returned through liquid seal 27 to the top of rectifier 23. Uncondensed gases pass through line 28. The chlorine content of such gases may then be recycled back to prechlorinator 20 and the hydrogen chloride content of the uncondensed gases may be recovered as muriatic acid.

Instead of packed rectifier columns, other suitable rectifying apparatus such as plate-containing columns or towers may be utilized for at least partially dehydrating chloral with HCl in accordance with the invention.

From the foregoing, it is seen that we have provided a unique and simple method for preparing chloral of relatively low water content from mixtures of chloral and substantial proportions of water. Our process is particularly adapted for use in conjunction with a continuous chlorination operation for producing a comparatively high strength chloral product directly from the chlorinator wherein the chloral is first formed, employing the hydrogen chloride evolved in the chlorination reaction as the dehydrating agent in accordance with the invention principles, such chloral product being highly suitable for direct use in DDT condensation operations without any further removal of water such as, for example, by the prior art treatment with sulfuric acid or benzene. The instant invention also possesses the advantages of enabling the water removed from the chlorinator containing the chloral-water starting mixtures, to be returned to the chlorinator, thus reducing or eliminating entirely the necessity of additional water feed to the chlorinator, and further, any chlorination catalyst used, e. g. the antimony chloride employed in chlorinator 2 of Example 3 above, remains in the chlorinator during the chloral dehydration or rectification operation of the invention, and does not contaminate the dehydrated chloral product, whereas in prior art procedures, e. g. wherein the chloral-water mixtures, following chlorination, are dehydrated by a separate distillation with sulfuric acid, the catalyst is removed from the final chlorinator and must be recovered from the still bottoms following distillation of the chloral.

While the liquid chloral product of low water content produced by the invention process may contain small amounts of dissolved hydrogen chloride, as indicated in the distillate analyses set forth in Tables I, II and III above, this HCl content does not adversely affect the condensation reaction which takes place when such chloral product is reacted with monochlorobenzene for production of DDT.

Since various changes and modifications in the invention, without departing from the spirit thereof, will occur to those skilled in the art, the invention is to be taken as limited only by the scope of the appended claims.

We claim:

1. A method of producing a chloral product of 2–4% water content from a mixture of chloral and water comprising vaporizing said mixture, introducing therein at least one part by weight of HCl for every four parts of water vapor present, rectifying the resulting mixture at a boiling point of at least a portion of the mixture of hydrogen chloride and water vapor present and separating the gas phase containing said chloral product of 2–4% water content from the liquid phase rich in aqueous hydrochloric acid.

2. A method of producing a chloral product of less than 4% water content from a mixture of chloral and water comprising vaporizing said mixture, introducing therein at least one part by weight of HCl for every four parts of water vapor present, rectifying said mixture under conditions such that the temperature of the exit vapors does not exceed 95° C. and taking off the exit vapors as a chloral product containing less than 4% water while leaving the liquid phase rich in aqueous hydrochloric acid.

3. A method of producing a chloral product of 2–4% water content from a mixture of chloral and water comprising vaporizing said mixture, introducing therein at least one part by weight of HCl for every four parts of water vapor present, rectifying said mixture under such conditions that the temperature of the exit vapors is between 75–90° C. and taking off the exit vapors as a chloral product of 2–4% water content while leaving the liquid phase rich in aqueous hydrochloric acid.

4. A method of producing a chloral product of 2–4% water content from a mixture of chloral and water comprising vaporizing said mixture, introducing therein five to ten parts by weight of HCl for every four parts of water vapor present, rectifying said mixture under such conditions that the temperature of the exit vapors is between 75–90° C. and taking off the exit vapors as a chloral product of 2–4% water content while leaving the liquid phase rich in aqueous hydrochloric acid.

References Cited in the file of this patent

UNITED STATES PATENTS

| | | |
|---|---|---|
| 1,774,507 | Ernst et al. | Sept. 2, 1930 |
| 2,351,000 | Brown et al. | June 13, 1944 |
| 2,559,247 | Goebel et al. | July 3, 1951 |
| 2,584,036 | Mahoney et al. | Jan. 29, 1952 |
| 2,606,864 | Cave et al. | Aug. 12, 1952 |

OTHER REFERENCES

Horsley: "Table of Azeotropes and Nonazeotropes," Analytical Chemistry, vol. 19, pp. 508 and 509.